United States Patent Office 3,440,186
Patented Apr. 22, 1969

3,440,186
INORGANIC POLYMERS
Selwyn H. Rose, King of Prussia, Pa., assignor to Pennsalt Chemicals Corporation, Philadelphia, Pa., a corporation of Pennsylvania
No Drawing. Filed Apr. 14, 1965, Ser. No. 447,978
Int. Cl. C08g *33/20, 33/16*
U.S. Cl. 260—2           8 Claims

ABSTRACT OF THE DISCLOSURE

Polymers having an inorganic backbone involving a doubly bridged bivalent tetrahedral metal where each of said bridging groups is the anion of an acid $R_2P(O)OH$, where R is a hydrocarbon of 2–18 carbon atoms, said bridging groups being different from each other and forming an 8 membered ring with said tetrahedral metal, and said hydrocarbon members in each of said bridging groups being alkyl, the alkyl groups in one bridging group differing from those in the other bridging group by at least 3 carbon atoms.

---

This invention relates to improved coordination polymers and, more particularly, is concerned with novel polymers involving a doubly bridged (catenated) bivalent tetrahedral metal whereby the polymer backbone is entirely inorganic. These polymers, because of their improved stability over a wide range of temperature are extremely useful for conversion to shaped articles and as coating compositions to be employed under a wide range of temperature conditions.

In the disclosure of Ser. No. 259,715, filed Feb. 19, 1963, now U.S. 3,255,125, granted June 7, 1966, there is described a polymer having the repeating units $M(Y)_2$ wherein M is a bivalent tetrahedral metal and Y is a bridging group with a charge of —1. The solid polymers of Ser. No. 259,715 may be represented as compounds containing a plurality of recurring units having the structure

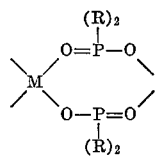

wherein M is a bivalent tetrahedral metal, and the R groups are inert organic and inorganic groups. That disclosure also indicates that copolymers where the R groups are different and having the above described recurring units may be prepared. The structure given in the above formula is in accord with conventional designations for coordination compounds. Examples of such usage can be found in "The Chemistry of the Co-ordination Compounds" by John C. Bailar, Jr., Reinhold Publishing Co., 1956, and Sidgwick's treaties "Chemical Elements and Their Compounds," Oxford University Press, 1950.

The polymers and copolymers of Ser. No. 259,715 have good high temperature properties being stable to above about 400° C. Furthermore, the best of these polymers, when fabricated into various useful shapes retain their flexibility and show little, if any, brittleness down to temperatures of about +90° C. Some homopolymers have glass transition temperatures below +90° C., but these cannot be easily fabricated.

It has now unexpectedly been found, however, that certain specific copolymer compositions have extremely superior low temperature properties and are thermally stable at temperatures from as low as about —100° C. to about +250° to +300° C. These improved copolymers which constitute an embodiment of this invention are those copolymers having in their backbone the structure

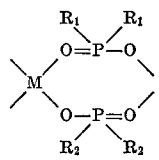

where M is selected from the group consisting of zinc, cobalt, beryllium, and manganese, and $R_1$ and $R_2$ are alkyl of two to eighteen carbon atoms and with the proviso that $R_1$ and $R_2$ differ in carbon content by at least three carbon atoms.

These copolymer compositions have unexpectedly good low temperature properties. The glass transition temperature ($T_g$) of a copolymer is expected to be intermediate in value with respect to the $T_g$'s of the constituent homopolymers. The relationships predicted between the $T_g$ of a normal copolymer and the $T_g$'s of its constituent homopolymers are discussed in Neilsen, "Mechanical Properties of Polymers," Reinhold Publishing Corp., p. 27. In contrast to this expected behavior, the copolymers of this invention have brittle points ($T_g$) that are substantially below the brittle point of either of the related homopolymers. Furthermore, these copolymers retain their excellent low temperature properties over a very large composition range.

The catenation of or bridging groups in the copolymers will have a charge of —1 and will comprise the anion of an acid, $R_2P(O)OH$, which is based on the group of phosphinic acids. It is evident that for the purpose of forming the polymer backbone by bridging the metal M atoms, only two coordinating positions of each phosphorous atom are used. Thus the unused positions of the phosphorus atom are satisfied with two R groups. As indicated, the R groups will be a hydrocarbon alkyl containing from two to eighteen carbon atoms, as, for example, ethyl, t-butyl, hexyl, octyl, decyl, dodecyl, tetradecyl, hexadecyl, and octodecyl, and in each repeating unit $R_1$ and $R_2$ in the above described structure will differ by at least three carbon atoms.

Many of the phosphinic acids which may be used as bridging groups are disclosed by Kosolapoff in his book "Organophosphorus Compounds," John Wiley, 1950.

Specific examples of the polymers of the invention include those having the following units:

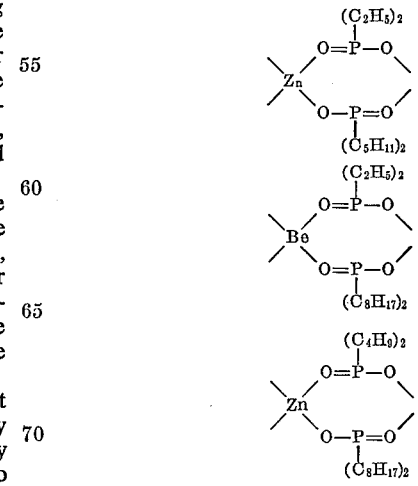

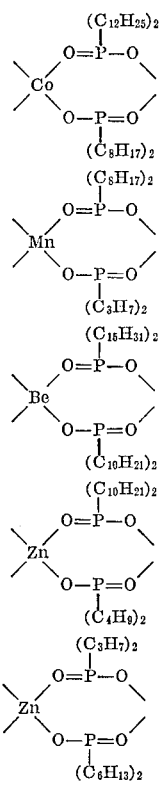

The processes by which the copolymers of this invention may be made are quite straightforward. In the preferred technique the reaction of a mixture of appropriate phosphinic acids with a bivalent tetrahedral metal acetate is conducted in an alcohol or ketone (e.g. ethanol or acetone) solution, an aromatic solvent (e.g. benzene, xylene), or in a halohydrocarbon such as chloroform. The product precipitates from the alcohol or solution and is separated and, if desired, washed with one or more solvents to aid in its purification. With other solvents in which the product is soluble, the solvent is evaporated and product recovered in the usual manner. In the case of the beryllium polymers, the preferred process involves a melt polymerization using beryllium acetylacetonate.

The amount of each component in the phosphinic acid mixture may vary over a wide range and is not critical. It is preferred that mole fractions of the phosphinic acids range from 30% to 70%. From a practical standpoint, the mole ratio of phosphinic acids in the mixture will range from 5% to 95% to 95% to 5%. It is also to be understood that while the copolymers of this invention contain the above described structure, the copolymers will also contain some units where $R_1$ and $R_2$ are the same. However, the structural units described above where $R_1$ and $R_2$ differ will predominate in number over any other type of configuration which could result from a statistical distribution.

The products of the invention may be pressure molded at approximately 160° C. to almost any desired shape. They have particular value as low temperature gaskets, liners, O-rings, protective coatings and the like.

EXAMPLE 1

The addition of 0.10 mole of zinc acetate dihydrate to a solution of 0.10 mole of $(C_4H_9)_2P(O)OH$ and 0.10 mole of $(C_8H_{17})_2P(O)(OH)$ in 2 liters of ethanol, followed by brief reflux, resulted in a white precipitate when the reaction mixture was cooled to room temperature. A yield of 48 g. was obtained after filtration and overnight vacuum drying at 75° C. Calculated for the 1:1 copolymer containing Zn(II) and the $OP(C_4H_9)_2O^-$ and $OP(C_8H_{17})_2O^-$ catenating groups: C, 54.2%; H, 9.8%; P, 11.6%; Zn, 12.3%. Found: C, 54.7%; H, 10.1%; P, 11.6%; Zn, 11.9%. The copolymer is soluble in benzene and chloroform, but insoluble in water. The molecular weights have been found to be above 10,000 by vapor pressure osmometry in chloroform and the intrinsic viscosities to be on the order of 0.5 dl./gm. As initially prepared, the copolymer is a crystalline material, which melts at about 150° C. to form an amorphous plastic that shows no tendency to crystallize. At approximately 150° C. and slight pressure it can be fabricated into films and thick shaped articles that have leathery properties at room temperature. Fabricated speciments retain their shape to over 100° C. and remain flexible to below —100° C.

EXAMPLE 2

The 2:1 copolymer of Zn(II) with $OP(C_4H_9)_2O^-$ and $OP(C_8H_{17})_2O^-$ (with $OP(C_4H_9)_2O^-$ groups in excess) was similarly prepared by reaction of stoichiometric amounts of zinc acetate dihydrate with an ethanol solution containing the appropriate phosphinic acids in a 2:1 mole ratio. The 2:1 copolymers have intrinsic viscosities of approximately 0.4 in chloroform. When fabricated, the product is tougher and stronger than the 1:1 copolymer, but less flexible. Shaped articles retain their flexibility to approximately —95° C.

The copolymer films in general increase in toughness with increasing butyl content but decrease in flexibility at low temperature, i.e., the 4:1 copolymer is flexible down to only about —75° C. On the other hand as the butyl content decreases the copolymer becomes softer and more wax-like and the brittle temperature increases. Thus the 1:3 copolymer with octyl groups in excess becomes brittle at about —85° C.

EXAMPLE 3

The addition of 10 mmoles of cobalt acetate tetrahydrate to an ethanolic solution of 10 mmoles of $(C_4H_9)_2P(O)OH$ and 10 mmoles of $(C_8H_{17})_2P(O)OH$, followed by several hours of reflux, resulted in a clear blue solution. The precipitate formed at room temperature was filtered off, and dried in a vacuum oven at 110° C. yielding 3.0 grams of product. Calcd. for the 1:1 copolymer containing Co(II) with $OP(C_4H_9)_2O^-$ and $OP(C_8H_{17})_2O^-$ catenating groups: C, 54.9%; H, 10.0%; P, 11.8%. Found: C, 56.0%; H, 10.3%; P, 11.4%. The copolymer has an intrinsic viscosity of approximately 0.4 in chloroform. The product may be fabricated at 175° C. to form flexible, leathery films, that remain flexible down to about —60° C., a temperature where films of either homopolymer become brittle.

EXAMPLE 4

The 1:1 copolymer of Zn(II) with dibutylphosphonic acid and didecylphosphonic acid catenating groups was similarly prepared by reaction of zinc acetate dihydrate with a hot ethanol solution containing stoichiometric quantities of $(C_4H_9)_2P(O)OH$ and $(C_{10}H_{21})_2P(O)OH$. This copolymer has an intrinsic viscosity in chloroform of approximately 0.4. As initially prepared the coplymer is a crystalline material melting at about 125° C. to form an amorphous polymer that shows no tendency to crystallize. At approximately 150° C. and slight pressure it can be fabricated into films and thick shaped articles that have good elongation. The fabricated specimens remain flexible down to approximately —80° C.

EXAMPLE 5

The 1:1 copolymer of Zn(II) with dibutylphosphinic acid and ditetradecylphosphinic acid was analogously prepared. This copolymer has an intrinsic viscosity in chloroform of approximately 0.35. The crystalline polymer melts at about 115° C. to form an amorphous material that very gradually turns crystalline. At approximately 130° under slight pressure this copolymer can be fabricated into films and shaped articles that exhibit rubber-like properties and have considerable elongation. The fabricated specimens remain flexible down to about —70° C.

EXAMPLE 6

The 1:1 copolymer of Zn(II) with dioctylphosphinic acid and ditetradecylphosphinic acid was analogously prepared. The crystalline polymer melts at about 110° C. to form an amorphous plastic that very gradually turns crystalline. It has an intrinsic viscosity of about 0.35 in chloroform. At approximately 140° C. under slight pressure, it may be fabricated into films and other shaped articles that exhibit rubber-like properties when stretched and have considerable elongation. The fabricated specimens remain flexible down to about −85° C.

In order to further illustrate the lower glass transition temperature ($T_g$) shown by the copolymers of this invention the following comparative data is given:

| Polymer | $T_g$, ° C. |
|---|---|
| Homopolymer of $Zn[OP(C_6H_5)_2O]_2$ | >300 |
| Homopolymer of $Zn[OP(CH_3)_2O]_2$ | About +90 |
| Homopolymer of $Zn[OP(CH_3)(C_6H_5)O]_2$ | About +90 |
| Homopolymer of $Zn[OP(CH_3)_2O]_2$ | About +90 |
| Homopolymer of $Zn[OP(C_4H_9)_2O]_2$ | About −40 |
| Homopolymer of $Zn[OP(C_8H_{17})_2O]_2$ | About −50 |
| Homopolymer of $Zn[OP(C_{10}H_{21})_2O]_2$ | About −55 |
| Homopolymer of $Zn[OP(C_{14}H_{29})_2O]_2$ | About −60 |
| 1:1 copolymer of $Zn[OP(C_6H_5)_2O]_2$ and $Zn[OP(CH_3)_2O]_2$ | About +120 |
| 1:1 copolymer of $Zn[OP(C_6H_5)(CH_3)O]_2$ and $Zn[OP(CH_3)_2O]_2$ | About +90 |
| 1:1 copolymer of $Zn[OP(C_6H_5)_2O]_2$ and $Zn[OP(C_6H_5)(CH_3)O]_2$ | About +150 |
| Copolymer of example 1 | Below −100 |
| Copolymers of example 2: | |
| 2:1 copolymer | About −95 |
| 4:1 copolymer | About −75 |
| 1:3 copolymer | About −85 |
| Copolymer of example 4 | About −80 |
| Copolymer of example 5 | About −70 |
| Copolymer of example 6 | About −85 |
| Homopolymer of $Co[OP(CH_3)_2O]_2$ | About +85 |
| Homopolymer of $Co[OP(CH_3)(C_6H_5)O]_2$ | About +130 |
| Copolymer of example 3 | About −60 |

EXAMPLE 7

To a cyclohexanol solution of 20 mmoles of $$(C_3H_7)_2P(O)OH$$

and 20 mmoles of $(C_6H_{13})_2P(O)OH$ was added 20 mmoles of beryllium acetylacetonate, the reaction mixture refluxed for several hours, and the acetylacetone reaction product periodically removed by distillation. The resulting 1:1 copolymers of Be(II) with $OP(C_3H_7)_2O^-$ and $OP(C_6H_{13})_2O^-$ was separated by filtration at room temperature. It may be fabricated into films and other shaped articles at elevated temperatures.

In like manner similar copolymers are prepared by reacting manganese acetate with a 1:1 molar mixture of dibutylphosphinic acid and dioctyl phosphinic acid.

It will be understood that numerous modifications may be made from the above description and examples without departing from the spirit and scope of the invention.

I claim:
1. A polymer having in its backbone as a repeating unit a doubly bridged bivalent tetrahedral metal selected from the group consisting of zinc, and cobalt wherein each of said bridging groups is the anion of an acid $R_2P(O)OH$, where R is alkyl of two to eighteen carbon atoms, said bridging groups being different from each other and forming an eight-membered ring with said tetrahedral metal, and wherein said alkyl members of one of said bridging groups differ from the alkyl groups in the other bridging group by at least three carbon atoms.

2. A polymer as in claim 1 wherein the tetrahedral metal is zinc.

3. A polymer as in claim 1 wherein the tetrahedral metal is cobalt.

4. A polymer having in its backbone as a repeating unit a zinc atom doubly bridged with the anions of dibutylphosphinic acid and dioctylphosphinic acid to form an eight-membered ring.

5. A polymer having in its backbone as a repeating unit a cobalt atom doubly bridged with the anions of dibutylphosphinic acid and diocetylphosphinic acid to form an eight-membered ring.

6. A polymer having in its backbone as a repeating unit a zinc atom doubly bridged with the anions of dibutylphosphinic acid and didecylphosphinic acid to form an eight-membered ring.

7. A polymer having in its backbone as a repeating unit a zinc atom doubly bridged with the anions of dibutylphosphinic acid and ditetradecylphosphinic acid to form an eight-membered ring.

8. A polymer having in its backbone as a repeating unit a zinc atom doubly bridged with the anions of dioctylphosphinic cacid and ditetradecylphosphinic acid to form an eight-membered ring.

References Cited

UNITED STATES PATENTS 3,255,125    6/1966    Block et al. _____ 260—2

SAMUEL H. BLECH, *Primary Examiner.*

U.S. Cl. X.R.

260—33.6, 33.8